J. R. MOFFATT.
TRIMMING MECHANISM FOR SEWING MACHINES.
APPLICATION FILED MAR. 11, 1907.
1,135,709.
Patented Apr. 13, 1915.
2 SHEETS—SHEET 1.
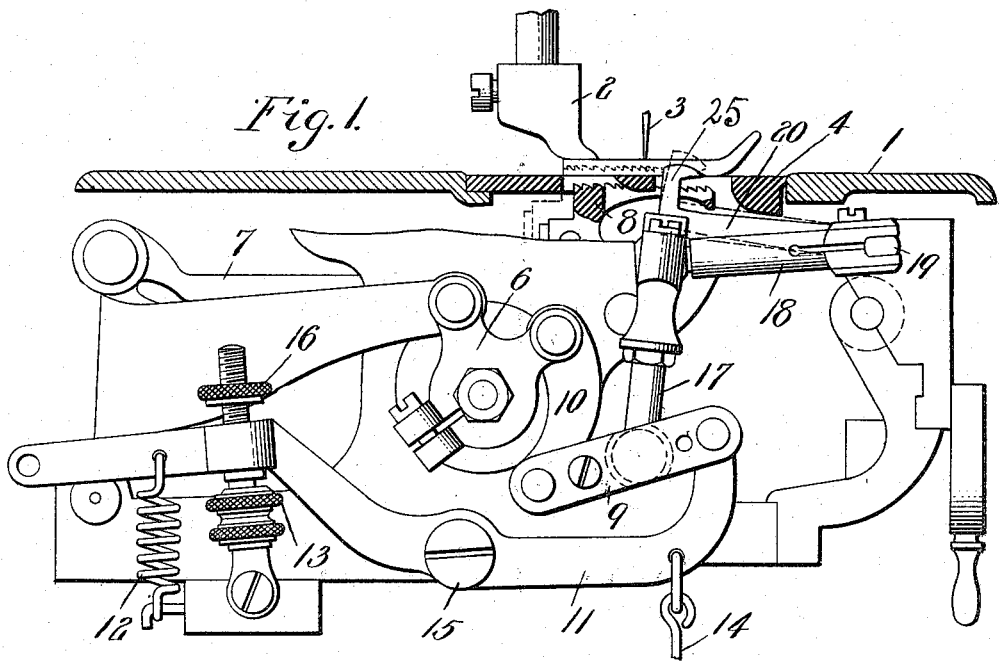
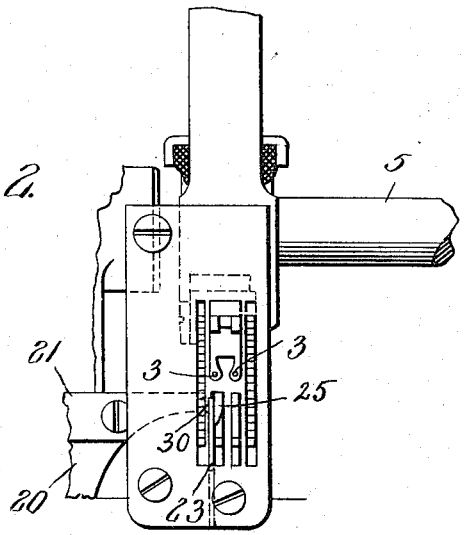
Witnesses
Inventor
James R. Moffatt
By Shurtevant & Mason
Attorneys J. R. MOFFATT.
TRIMMING MECHANISM FOR SEWING MACHINES.
APPLICATION FILED MAR. 11, 1907.
1,135,709.
Patented Apr. 13, 1915.
2 SHEETS—SHEET 2.
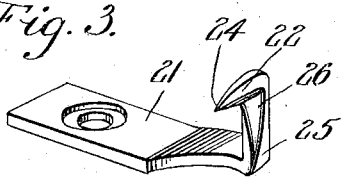
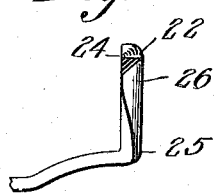
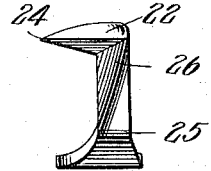
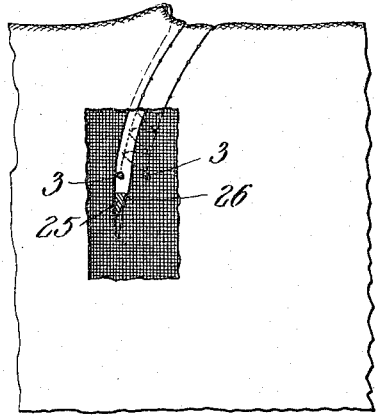
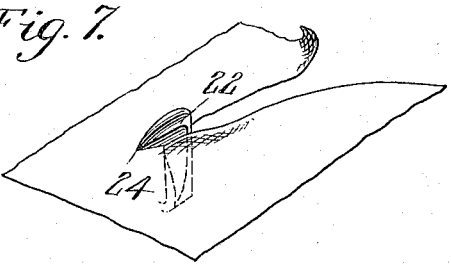
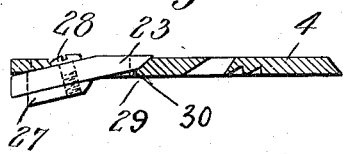
Witnesses
Inventor
James R. Moffatt
By Sturtevant & Mason
Attorneys

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

TRIMMING MECHANISM FOR SEWING-MACHINES.

1,135,709. Specification of Letters Patent. Patented Apr. 13, 1915.

Application filed March 11, 1907. Serial No. 361,697.

*To all whom it may concern:*

Be it known that I, JAMES R. MOFFATT, a citizen of the United States, residing at Chicago, in the county of Cook, State of Illinois, have invented certain new and useful Improvements in Trimming Mechanisms for Sewing-Machines, of which the following is a description, reference being had to the accompanying drawing and to the letters and figures of reference marked thereon.

My invention relates to new and useful improvements in trimming mechanisms, and has for its object to improve the structure of the trimming members and also the manner of supporting the same.

While I have shown my improved trimming mechanism as applied to a sewing machine, it will be obvious that said trimming mechanism may be used in any relation where it is desired to trim or cut a layer or layers of fabric, and to deflect one of the cut edges from the other. I have also shown my trimming mechanism as operating to sever only one of two superposed layers of fabric by lifting the upper layer and supporting the same, while the other layer is being cut, but it will be obvious that my trimming mechanism may be used to sever all of the layers of fabric passing through the machine.

My invention consists in a trimming member having an overhanging cutting blade and a tapered shank for supporting said overhanging cutting blade, said tapered shank operating to deflect one of the cut edges from the other cut edge.

My invention further consists in means for supporting the lower trimming member, so that the same may be held rigidly when under the strain of the cutting action of the other cutting member.

My invention further consists in the novel parts, improvements and arrangements hereinafter shown and described, and set forth in the claims.

In the drawings, which show one embodiment of my invention, Figure 1 is a side view partly in section, showing a sewing machine having my improved trimming mechanism applied thereto; Fig. 2 is a top plan view showing a section of a sewing machine having my trimming mechanism applied thereto; Fig. 3 is a perspective view of my upper trimming member; Fig. 4 is a front view of the same; Fig. 5 is a side view of the same; Fig. 6 is a plan view, showing the relation of the trimming member to the needles of a sewing machine, and the manner in which one of the cut edges is deflected between said needles, the upper layer of fabric being broken away to more clearly show this relation of parts and the trimming member being sectioned; Fig. 7 is a perspective view showing the relation of the trimming member with its tapered shank, to a layer of fabric which is being cut; Fig. 8 is a sectional view, showing the manner of supporting my lower trimming member.

The trimmer-operating mechanism shown in Fig. 1 of the drawing is similar to that shown in my application Serial No. 353,277, filed January 21st, 1907, and consists generally speaking, of a work support 1; presser foot 2; needles 3, 3; a throat plate 4; a main shaft 5, which carries at its forward end a double crank 6, one of which operates the feed bar 7 carrying the feed dog 8, and the other of which operates upon a lever 9 through a link 10. Said lever 9 is fulcrumed upon a controlling bar 11, which is held by means of a spring 12 in contact with a stop nut 13. By means of a link 14, said controlling bar 11 may be turned about its pivotal support 15, until the same is brought into contact with the stop nut 16. Said lever 9 is connected by means of a link 17 with a rock arm 18, secured to a shaft 19 on which the trimmer bar 20 is supported. Said trimmer bar carries at its outer end the upper trimming member 21. Said trimming member 21 extends up through the throat plate, and has an overhanging blade 22, which coöperates with the stationary blade 23 secured to the throat plate. Said trimming members, as shown in Fig. 2, are located so that the line on which the fabric or material is severed, passes practically through the left hand needle or needle puncture. This upper trimming member has a forwardly projecting tapered blade with a penetrating point 24, and a shank 25, which tapers substantially from the plane of the cutting edge of the cutting blade to the rear side of said shank, as clearly shown in Figs. 3, 4 and 5. The purpose of this tapered portion 26, is to deflect one of the cut edges.

As shown in Fig. 6, the trimming mechanism when operating in connection with stitching mechanism, is located in front of the same, and the plane of the cutting edges of the trimming blades, passes substantially through, or just to the left of one of said needles. One of the cut edges of the fabric will, therefore, pass along the outside of said needles, so that the cross stitching mechanism will not engage the same. The other cut edge is by means of the tapered shank of the cutter, deflected centrally between said needles, so that the cut edge is placed well back from the needle in order that the stitches may lie well over said cut edge, and prevent the cut loops of fabric from showing through the covering threads of the overedging stitches.

In the preferred form of my invention, the penetrating point 24 of the upper trimming member serves to separate the two superposed layers, so that the under layer only is trimmed, and one of the cut edges is deflected by the tapered shank portion of the cutting member between the needles of the stitching mechanism, and said edge is stitched down to the upper layer of fabric.

The lower trimming member is supported on the throat plate by a depending lug 27, which is recessed so as to form a seat for the lower end of said trimming member. Said trimming member is held in its seat by means of a screw 28, shown in dotted lines in Fig. 8. The throat plate 4, is also provided with a seat or recess 29, in which the forward end of a trimming blade 23 rests, thus forming a rigid support for said trimming member, which will also prevent said trimming member from being deflected laterally.

The operation of the upper trimming member is such that considerable strain is placed upon the lower trimming member, and, therefore, I have found it quite essential to provide means for rigidly and firmly supporting the said lower trimming member and holding the same against lateral movement.

While I have shown the trimming mechanism so located relative to the stitching mechanism that the tapered portion of the shank of the cutting blade operates to deflect one of the cut edges between said needles, it is quite obvious that said trimming mechanism may be shifted relative to the stitching mechanism, so that the deflected edge may be carried outside of both needles and the non-deflected edge arranged to pass between the needles. It will further be obvious that although I have shown my trimming mechanism operating in connection with stitch-forming mechanism, that the trimming blade with the deflecting tapered shank may be used in any relation where it is desired to deflect one of the two cut edges.

The operation of my device will be obvious from the above description. The movable trimming member 25, is oscillated across the plane of the fabric through the link 17, the lever 9 and the double crank member 6, carried by the main shaft. The feed dog operates when the trimmer is raised, to move the fabric forward, and as the fabric which has been severed is moved forward, the tapered shank of the trimming member deflects one of the cut edges away from the other, and, as shown in Fig. 6, said cut edge is deflected between spaced needles 3, 3. If, however, the trimming blades be adjusted relative to the stitching mechanism to the right, as shown in Fig. 6, the tapered shank would then deflect the cut edge outside of the right hand needle, while the other edge of the fabric would pass between said needles. The main purpose of the tapered shank is to open up the cut edges so as to make a clear passage for one of the needles, while overstitching one of the cut edges.

By providing the throat plate with a seat 29 for the forward free end of the lower stationary trimming blade, and by extending the ledge 30, which forms one wall of said seat, so that the same overlaps the end of the blade, as clearly shown in Fig. 2, I have provided means which will not only take the downward thrust upon the stationary cutting blade, but which will also prevent said cutting blade from being moved laterally, and the material drawn between the cutting blades rather than severed.

It will be obvious that minor changes in the details of the construction herein shown may be made, without departing from the spirit of my invention.

Having thus described my invention, what I claim as new and desire to secure by Letters Patent, is:—

1. A sewing machine comprising in combination stitch-forming mechanism, including two spaced needles and a trimming mechanism including a trimmer blade arranged in advance of said needles, said trimming blade having its cutting edge at one face thereof and lying in a line passing outside of said needles whereby one of the cut edges will be directed outside of said needles and means for directing the other cut edge between said needles.

2. A sewing machine including in combination, stitch-forming mechanism comprising spaced needles and a trimming mechanism, including a trimming member arranged in front of said needles and having a tapered shank for deflecting one of the cut edges between the said spaced needles; substantially as described.

3. A sewing machine including in combination, stitch-forming mechanism, comprising spaced needles and a trimming mechanism including an overhanging trimming blade, a tapered shank for supporting the same, one face of said shank lying in a vertical plane extending outside of said needles, and the other face of said tapered shank lying in a vertical plane passing between said needles; substantially as described.

4. A sewing machine including in combination, stitch-forming mechanism comprising spaced needles and a trimming mechanism arranged in front of said needles, comprising upper and lower trimming members, said upper trimming member having a pointed overhanging cutting blade, and a tapered shank for supporting said cutting blade, said tapered shank having one face thereof lying in the plane of the cutting edge, and the other face thereof extending at an angle thereto, whereby one of the cut edges is deflected between said spaced needles; substantially as described.

5. A sewing machine including in combination, stitch-forming mechanism comprising spaced needles and a trimming mechanism, including a lower stationary member, and an upper movable cutting member, said upper movable cutting member having a pointed forward end and an overhanging cutting edge, and a shank for supporting the same having a tapered face, whereby one of the cut edges is deflected from the other cut edge, said trimming mechanism being so located relative to said needles that one of said needles operates in the space between the separated cut edges; substantially as described.

6. A sewing machine including in combination, spaced needles, a feed dog, a trimming mechanism including a trimming member, a tapered shank for supporting said trimming member and lying in the path of movement of said fabric and in front of said needle, said tapered shank serving to deflect one of the cut edges from the other as the feed dog moves the material forward, the plane of the tapered portion extending between said needles, whereby one of the cut edges is deflected between said needles.

7. A sewing machine including in combination, spaced needles, a feed dog, a trimming mechanism including upper and lower trimming members, said upper trimming member having an overhanging cutting blade and a tapered shank, the tapered portion of said shank serving to deflect one of the cut edges between said needles, as the feed dog moves the material forward; substantially as described.

8. A sewing machine including in combination a stitch forming mechanism including spaced needles, a trimming mechanism in advance of said spaced needles and including a cutting device, means for separating layers of fabric to be stitched, whereby certain layers only may be cut, said cutting device having an overhanging cutting edge and a supporting shank, said supporting shank including means for separating the cut edges, one of said needles being behind the shank of the cutting device in the line of feed, whereby one of the cut edges is directed between the needles while the other cut edge is directed at one side of both needles.

9. In a trimming mechanism for sewing machines, a throat plate, a depending lug carried thereby, and a ledger blade supported by said lug and having its longitudinal axis inclined to the plane of the throat plate and having its upper end substantially flush with the upper surface of said throat plate, said plate having a seat for receiving the upper end of said ledger blade to prevent downward and lateral movements thereof.

In testimony whereof I affix my signature, in presence of two witnesses.

JAMES R. MOFFATT.

Witnesses:
C. McNEIL,
A. B. CLOTHIER.

Copies of this patent may be obtained for five cents each, by addressing the "Commissioner of Patents, Washington, D. C."